(12) United States Patent
Li et al.

(10) Patent No.: US 8,599,774 B2
(45) Date of Patent: Dec. 3, 2013

(54) NETWORK SWITCHING METHOD, DEVICE AND SYSTEM FOR MOBILE MULTIMEDIA SERVICES

(75) Inventors: Dongming Li, Shenzhen (CN); Yupeng Zhang, Shenzhen (CN); Wenda Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 12/848,838

(22) Filed: Aug. 2, 2010

(65) Prior Publication Data

US 2010/0296476 A1    Nov. 25, 2010

Related U.S. Application Data

(63) Continuation of application No. PCT/CN2008/071991, filed on Aug. 14, 2008.

(30) Foreign Application Priority Data

Feb. 2, 2008 (CN) .......................... 2008 1 0057529

(51) Int. Cl.
*H04W 28/04* (2009.01)
(52) U.S. Cl.
USPC ........... 370/329; 370/331; 370/332; 370/338; 455/450; 455/451; 455/436; 709/231; 709/249
(58) Field of Classification Search
USPC .................. 370/331, 332, 338; 709/231, 249; 455/436, 450, 451
See application file for complete search history.

(56) References Cited

U.S. PATENT DOCUMENTS

| 6,977,914 B2* | 12/2005 | Paila et al. ..................... 370/331 |
| 7,127,496 B2* | 10/2006 | Isozu et al. ..................... 709/217 |
| 7,212,781 B2* | 5/2007 | Hikomoto ..................... 455/3.01 |

(Continued)

FOREIGN PATENT DOCUMENTS

| CN | 101227745 A | 7/2008 |
| JP | 2007-259243 | 10/2007 |
| WO | WO 2006/097579 A1 | 9/2006 |
| WO | WO 2007/149029 A1 | 12/2007 |

OTHER PUBLICATIONS

Partial Translation of Office Action dated Apr. 13, 2010 in connection with Chinese Patent Application No. 200810057529.1.

(Continued)

*Primary Examiner* — Charles C Jiang
*Assistant Examiner* — Deepa Belur

(57) ABSTRACT

A network switching method, device and system for mobile multimedia services are provided. The method includes: detecting signal strength of media stream data of a first network, and when the signal strength of the media stream data of the first network is smaller than a first preset value, receiving media stream data of a second network in parallel; and buffering the media stream data of the second network, decoding the buffered media stream data of the second network, and playing the decoded media stream data of the second network. The device includes a first communication module, a detecting module, a switching module, a second communication module, a processing module and a playing module. The system includes a first network, a second network and a terminal. Through the method, device and system, the time delay in the process of switching the serving network is reduced, and the service interruption caused by the network switching when the terminal performs multimedia services is prevented.

6 Claims, 5 Drawing Sheets

(56) References Cited

U.S. PATENT DOCUMENTS

| | | | |
|---|---|---|---|
| 7,388,850 B2 * | 6/2008 | Ochi et al. ............... | 370/331 |
| 7,907,568 B2 * | 3/2011 | Klotsche ................ | 370/331 |
| 7,916,166 B1 * | 3/2011 | Habib et al. ............ | 348/14.08 |
| 8,086,169 B2 * | 12/2011 | Sinnarajah et al. ....... | 455/3.01 |
| 8,200,747 B2 * | 6/2012 | Apostolopoulos et al. ... | 709/203 |
| 2002/0091834 A1 * | 7/2002 | Isozu et al. .............. | 709/227 |
| 2005/0153650 A1 | 7/2005 | Hikomoto | |
| 2008/0144580 A1 * | 6/2008 | Su et al. ................. | 370/332 |
| 2010/0022244 A1 * | 1/2010 | McKibben ............... | 455/436 |
| 2010/0150105 A1 * | 6/2010 | Miao et al. .............. | 370/331 |
| 2011/0064050 A1 * | 3/2011 | Livet et al. ............. | 370/331 |
| 2011/0096754 A1 * | 4/2011 | Harris et al. ............ | 370/332 |
| 2011/0261784 A1 * | 10/2011 | Zeng et al. .............. | 370/331 |
| 2012/0002640 A1 * | 1/2012 | Baluja et al. ............ | 370/331 |

OTHER PUBLICATIONS

Written Opinion of the International Searching Authority dated Nov. 27, 2008 in connection with International Patent Application No. PCT/CN2008/071991.

Supplementary European Search Report dated Apr. 15, 2011 in connection with European Patent Application No. EP 08 78 3982.

Adrian Hornsby, et al., "PLUTO—Deliverable 2.2, Prototype Network Selection and Handover Algorithms", Jan. 10, 2006, 51 pages.

"Digital Video Broadcasting (DVB); IP Datacast over DVB-H: Implementation Guidelines for Mobility", ETSI TS 102 611 v1.1.1, Oct. 2007, 30 pages.

3rd Generation Partnership Project: Technical Specification Group Services and System Aspects: Multimedia Broadcast/Multicast Service (MBMS); Protocols and codecs (Release 7), 3GPP TS 26.346 v7.9.0, Dec. 2007, 132 pages.

Communication pursuant to Artcile 94(3) EPC dated May 9, 2012 in connection with European Patent Application No. EP 08 783 982.5.

International Search Report dated Nov. 27, 2008 in connection with International Patent Application No. PCT/CN2008/071991.

Communication pursuant to Artcile 94(3) EPC dated Dec. 13, 2011 in connection with European Patent Application No. EP 08 783 982.5.

Communication pursuant to Artcile 94(3) EPC dated Oct. 19, 2012 in connection with European Patent Application No. EP 08 783 982.5.

* cited by examiner

NETWORK SWITCHING METHOD, DEVICE AND SYSTEM FOR MOBILE MULTIMEDIA SERVICES

CROSS-REFERENCE TO RELATED APPLICATIONS

This application is a continuation of International Application No. PCT/CN 2008/071991, filed on Aug. 14, 2008, which claims priority to Chinese Patent Application No. 200810057529.1, filed on Feb. 2, 2008, both of which are hereby incorporated by reference in their entireties.

TECHNICAL FIELD

The present invention relates to the field of mobile communications, and more particularly to a network switching method, device and system for mobile multimedia services.

BACKGROUND

Mobile multimedia services (mobile phone TV services) are video information services provided by a mobile terminal for a user, and may be realized in two manners: one is to provide broadcast and unicast TV programs and information services to the mobile terminal through a mobile communication network, and the other is to provide broadcast TV programs and information services to the mobile terminal through terrestrial or satellite broadcasting.

Bearer networks for the mobile multimedia services may include a mobile communication network, a terrestrial digital broadcast network, and a satellite broadcast communication network. Technologies based on the mobile communication network include: technologies based on General Packet Radio Service (GPRS)/Enhanced Data rate for GSM Evolution (EDGE)/3rd Generation (3G) network that include a unicast Streaming Media (SM) technology; and technologies based on 3G network that include a Multimedia Broadcast/Multicast Service (MBMS) technology and a Broadcast Multicast Service (BCMCS) technology. Technologies based on the terrestrial digital broadcast network include Digital Video Broadcasting-Handheld (DVB-H) of Europe, Terrestrial-Digital Multimedia Broadcasting (T-DMB) of South Korea, MediaFLO based on FLO™ of Qualcomm, U.S., and China Mobile Multimedia Broadcasting (CMMB) of China. Technologies based on the satellite broadcast communication network include Satellite Digital Multimedia Broadcasting (S-DMB) of South Korea and Satellite Digital Multimedia Broadcasting (SDMB) of Europe. The mobile phone TV technology based on the terrestrial digital broadcast network has been adopted by more and more nations and regions because the technology has a good support for receiving digital broadcast TV signals of a portable device such as mobile phone, and at the same time a solution based on the technology combines the advantage of low costs and high bandwidth of the broadcast network with the advantage of mature user service system and available customized on-demand services of the mobile network.

Currently, the mature DVB-H mobile phone TV standard applied in Europe uses frequencies in VHF, UHF and S bands. The VHF and UHF bands are allocated to analog TV. Europe cannot completely close down analog TV to release resources of the frequency bands until 2016, while China cannot achieve the goal until 2015. At present, frequency spectrum resources that can be provided for operators to implement DVB-H are very limited, so it is very difficult to cover a large range and achieve some operation effect, and a better choice is to fully utilize various technical solutions to perform hybrid networking, for example, services are provided on the terrestrial digital broadcast network and the mobile communication network simultaneously to provide continuous services for the user. When the mobile terminal is switched from the terrestrial digital broadcast network to the mobile communication network or switched from the mobile communication network to the terrestrial digital broadcast network, it is required to buffer received data of a media stream of the mobile communication network or the terrestrial digital broadcast network, and the data cannot be decoded and played until at least data of a first I frame of the media stream is received.

Therefore, in the implementation of the present invention, the inventor found that the prior art at least has the following defects.

In the process of switching a serving network, a time delay exits between the start of reception of the media stream data and the playing of the media stream data, resulting in interruption of playing of the mobile terminal.

If the mobile terminal is switched from the terrestrial digital broadcast network to the mobile communication network, a time delay also exists for the establishment of an interactive connection of Real Time Streaming Protocol (RTSP) between the mobile terminal and an SM server through the mobile communication network, resulting in interruption of playing of the mobile terminal.

SUMMARY

Accordingly, the present invention is directed to a network switching method, device and system for mobile multimedia services, which can reduce the time delay in the process of switching the serving network, and prevent the service interruption caused by the network switching when the mobile terminal performs multimedia services.

In an embodiment, the present invention provides a network switching method for mobile multimedia services, which includes the following steps.

Signal strength of media stream data of a first network is detected, and when the signal strength of the media stream data of the first network is smaller than a first preset value, media stream data of a second network is received in parallel.

The media stream data of the second network is buffered, the buffered media stream data of the second network is decoded, and the decoded media stream data of the second network is played.

In an embodiment, the present invention provides another network switching method for mobile multimedia services, which includes the following steps.

A Multimedia Broadcast/Multicast Service (MBMS) Real-time Transport Protocol (RTP) media stream data packet or a Broadcast Multicast Service (BCMCS) RTP media stream data packet is buffered in a first buffer area.

Signal strength of the MBMS RTP media stream data packet or the BCMCS RTP media stream data packet is detected, and when the signal strength of the MBMS RTP media stream data packet or the BCMCS RTP media stream data packet is smaller than a second preset value, a unicast RTP media stream data packet is received in parallel, and the unicast RTP media stream data packet is buffered in a second buffer area.

When time stamp information carried in the RTP media stream data packet in the first buffer area is consistent with that carried in the RTP media stream data packet in the second buffer area, the RTP media stream data packet in the second buffer area is decoded, and the decoded RTP media stream data packet in the second buffer area is played.

In an embodiment, the present invention provides a network switching device for mobile multimedia services, which includes a first communication module, a detecting module, a switching module, a second communication module, a processing module and a playing module.

The first communication module is configured to receive media stream data of a first network.

The detecting module is configured to detect signal strength of the media stream data of the first network.

The switching module is configured to enable pre-switching when the detecting module detects that the signal strength of the media stream data of the first network is smaller than a first preset value.

The second communication module is configured to receive media stream data of a second network in parallel when the switching module enables the pre-switching.

The processing module is configured to buffer the media stream data of the second network.

The playing module is configured to decode the buffered media stream data of the second network, and play the decoded media stream data of the second network.

In an embodiment, the present invention provides another network switching device for mobile multimedia services, which includes a first buffer unit, a detecting unit, a second buffer unit, a determining unit and a playing unit.

The first buffer unit is configured to buffer a Multimedia Broadcast/Multicast Service (MBMS) Real-time Transport Protocol (RTP) media stream data packet or a Broadcast Multicast Service (BCMCS) RTP media stream data packet in a first buffer area.

The detecting unit is configured to detect signal strength of the MBMS RTP media stream data packet or the BCMCS RTP media stream data packet in the first buffer area.

The second buffer unit is configured to receive a unicast RTP media stream data packet in parallel, and buffer the unicast RTP media stream data packet in a second buffer area, when the detecting unit detects that the signal strength is smaller than a second preset value.

The determining unit is configured to determine whether time stamp information carried in the RTP media stream data packet in the first buffer area is consistent with that carried in the RTP media stream data packet in the second buffer area.

The playing unit is configured to decode the RTP media stream data packet in the second buffer area and play the decoded RTP media stream data packet in the second buffer area, when the determining unit determines that the time stamp information carried in the RTP media stream data packet in the first buffer area is consistent with that carried in the RTP media stream data packet in the second buffer area.

In an embodiment, the present invention provides a network switching system for mobile multimedia services, which includes a first network, a second network and a terminal.

The first network is configured to receive an encoded media signal, and provide media stream data of the first network to the terminal.

The second network is configured to receive the encoded media signal, and provide media stream data of the second network to the terminal.

The terminal is configured to detect signal strength of the media stream data of the first network, and receive the media stream data of the second network in parallel when the signal strength of the media stream data of the first network is smaller than a first preset value; and buffer the media stream data of the second network, decode the buffered media stream data of the second network, and play the decoded media stream data of the second network.

According to the embodiments of the present invention, when the signal strength of the media stream data of the first network is smaller than the first preset value, the pre-switching is performed, and the media stream data of the second network is received in parallel, and after the media stream data of the second network is buffered and decoded, the media stream data of the second network is played, so that the time delay in the process of switching the serving network is reduced, and the service interruption caused by the network switching when the terminal performs multimedia services is prevented.

Specific embodiments of the present invention are illustrated in further detail below with reference to the accompanying drawings.

DETAILED DESCRIPTION

According to the embodiments of the present invention, when signal strength of media stream data of a first network is smaller than a first preset value, media stream data of a second network is received in parallel to perform pre-switching, and after the media stream data of the second network is buffered and decoded, the media stream data of the second network is played. The first network may be, but not limited to, a terrestrial digital broadcast network, and the second network may be, but not limited to, a mobile communication network. A signal strength value causing network switching, that is, the first preset value needs to satisfy the following condition: time for which the signal strength of the terrestrial digital broadcast network attenuates from the value to such a value that the network is totally unavailable is equal to or slightly longer than a sum of time required for establishing a unicast connection between a mobile terminal and a Streaming Media (SM) server in the mobile communication network plus time required for buffering the media stream data until the media stream data is capable of being decoded and played. If the chosen strength value is improper, the terminal will receive excess media stream data of the mobile communication network in advance, or when the terrestrial digital broadcast network is unavailable, the mobile terminal is still buffering the media stream data of the mobile communication network, resulting in interruption of the ongoing multimedia services.

Figure 1:
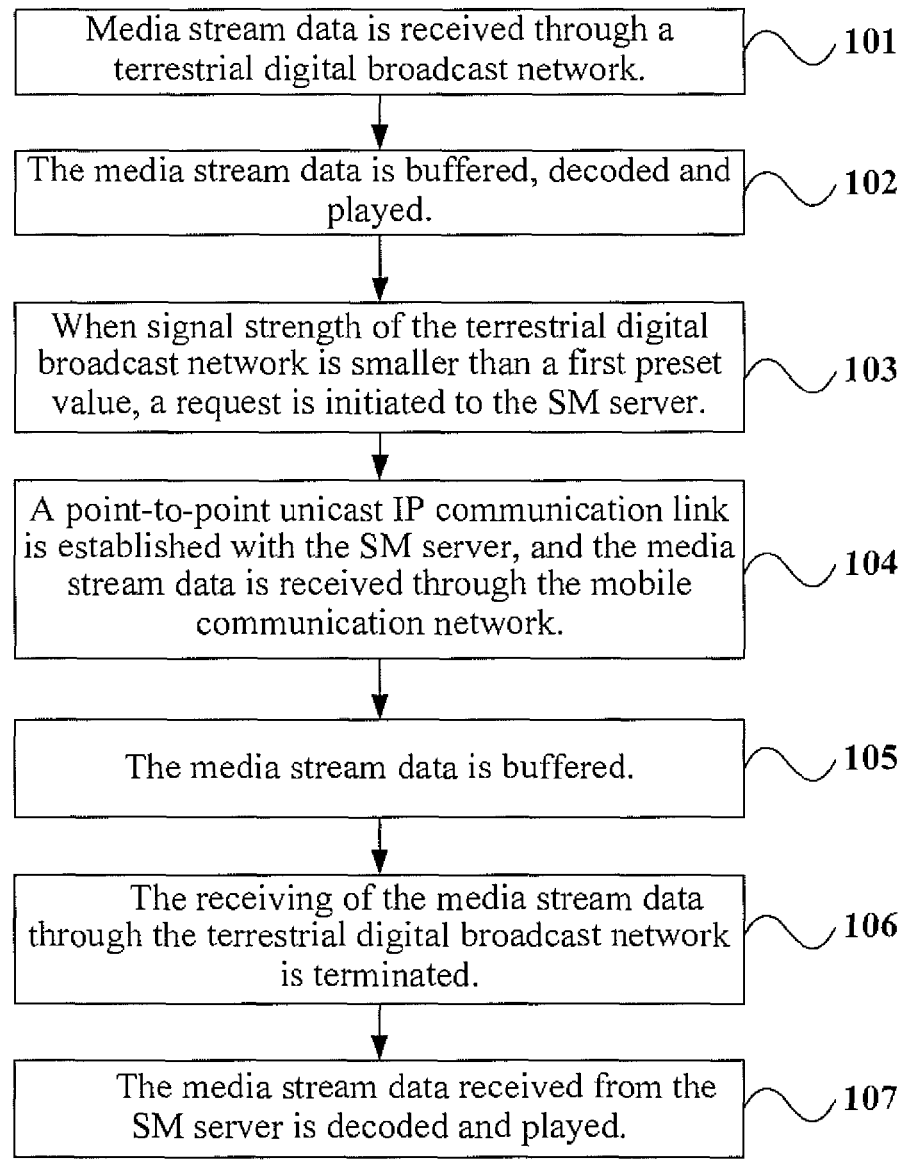
FIG. 1 is a schematic flow chart of a network switching method for mobile multimedia services according to an embodiment of the present invention.

FIG. 1 is a schematic flow chart of a network switching method for mobile multimedia services according to an embodiment of the present invention. An applicable condition of this embodiment is that one TV channel provides services in two networks simultaneously. The two networks of this embodiment are a 3G mobile communication network and a DVB-H terrestrial digital broadcast network, but the embodiments of the present invention are not limited thereto. After being encoded by an encoder, a video signal of a TV channel is provided to an SM server of the 3G system and a DVB-H system simultaneously in a multicast communication manner, by which the mobile terminal is served separately. In the 3G system, a theoretical maximum unicast downlink communication bandwidth is 384 Kbps. When one carrier frequency of a certain base station serves multiple users simultaneously, the bandwidth actually used by each user is about 256 Kbps. The DVB-H can provide a bandwidth much higher than the 3G system, while the mobile terminal generally has a Common Intermediate Format (CIF) resolution or a Quad Extended Graphics Array (QVGA) resolution, and a frame rate of 15 to 30. For example, a good playing effect can be achieved on the terminal by using an H.264 encoding format and a code stream rate of 200 Kbps. Therefore, in this embodiment, the media stream rate output by the encoder may be chosen to be 200 Kbps, which is applicable to both the mobile communication network and the terrestrial digital broadcast network.

A service guide server (SG-Server) generates service guide (SG) information described in XML based on an OMA BCAST standard, receives the SG information synchronized by a network-side mobile phone TV system, and provides the SG information of the channel to the mobile terminal.

One TV channel simultaneously describes two approaches for service acquisition: one is rtsp:\\ip:port\filepath\*.3gp, which describes an acquiring point providing unicast services in the mobile communication network, and identifies an IP address of the SM server, a domain name, and an identification of the TV channel, to enable the mobile terminal to establish a point-to-point IP connection with the SM server through a wireless communication network and transport media stream data of the TV channel; and the other is frequency point information used by the TV channel, which describes an acquiring point serving in the terrestrial digital broadcast network.

The user of the mobile terminal and a network operator can formulate strategies for service use according to such factors as the effect and service cost of the provision of mobile multimedia services, to set a service mode preferably used by the mobile terminal. In this embodiment, it is assumed that the service mode of the terrestrial digital broadcast network is preferably used. In this embodiment, the TV channel received by the mobile terminal is switched from the DVB-H terrestrial digital broadcast network to unicast of the mobile communication network, which includes the following steps.

In step 101, media stream data of the TV channel provided by the terrestrial digital broadcast network is received by tuning to a frequency point according to TV channel frequency point information in the SG-Server.

In step 102, the media stream data is buffered, decoded and played.

In step 103, signal strength of the terrestrial digital broadcast network is detected, and when the signal strength is smaller than a first preset value, a pre-switching process is enabled according to description information of a unicast service acquiring point in the SG-Server, and a request is initiated to the SM server through the mobile communication network. The request comprises an identification of the TV channel.

The first preset value, that is, a signal strength value causing network switching may be preset in the mobile terminal or by the operator in the SG-Server, and needs to satisfy the following condition: time for which the signal strength of the terrestrial digital broadcast network attenuates from the value to such a value that the network is totally unavailable is equal to or slightly longer than a sum of time required for establishing a unicast connection between the mobile terminal and the SM server in the mobile communication network plus time required for buffering the media stream data until the media stream data is capable of being decoded and played. If the chosen strength value is improper, the terminal will receive excess media stream data of the mobile communication network in advance, or when the terrestrial digital broadcast network is unavailable, the mobile terminal is still buffering the media stream data of the mobile communication network, resulting in interruption of the ongoing multimedia services.

In step 104, a point-to-point unicast IP communication link is established with the SM server, and the media stream data of the TV channel provided by the mobile communication network is received in parallel.

In step 105, the media stream data is buffered.

In step 106, a switching process is enabled, and when the media stream data received by the mobile terminal is buffered to such an extent that the media stream data is capable of being decoded, the receiving and playing of the media stream data of the TV channel provided by the terrestrial digital broadcast network are terminated.

After the received media stream data provided by the mobile communication network is buffered, the media stream data provided by the terrestrial digital broadcast network may also not be terminated, that is, the media stream data provided by the terrestrial digital broadcast network may be received but not processed.

In step 107, the media stream data received from the SM server is decoded and played.

In this embodiment, the mobile terminal is switched in a network providing mobile phone TV services that is formed by hybrid networking of the terrestrial digital broadcast network and the mobile communication network. When the mobile terminal receives the media stream data of the terrestrial digital broadcast network, the frequency signal strength of the terrestrial digital broadcast network is detected, and when it is detected that the frequency signal strength of the broadcast network attenuates to a preset value, the pre-switching is enabled. At this time, the mobile terminal receives the mobile phone TV services, that is, the media stream data from the mobile communication network in parallel. When the received media stream data is buffered to such an extent that the media stream data is capable of being decoded and played, the receiving of the media stream data from the broadcast network is terminated, and the media stream data received from the mobile communication network is decoded and played. Thus, the switching is completed. Through this embodiment, the time delay in the process of switching the serving network is reduced, and the service interruption caused by the network switching when the mobile terminal performs multimedia services is prevented.

Further, after the step 107, this embodiment may further include the following steps.

The signal strength of the terrestrial digital broadcast network is detected, and when the signal strength of the terrestrial digital broadcast network is greater than the first preset value, the media stream data of the terrestrial digital broadcast network is received in parallel.

After the media stream data of the terrestrial digital broadcast network is buffered, the receiving of the media stream data of the mobile communication network is terminated.

The media stream data of the terrestrial digital broadcast network is decoded, and the decoded media stream data of the terrestrial digital broadcast network is played.

Figure 2:
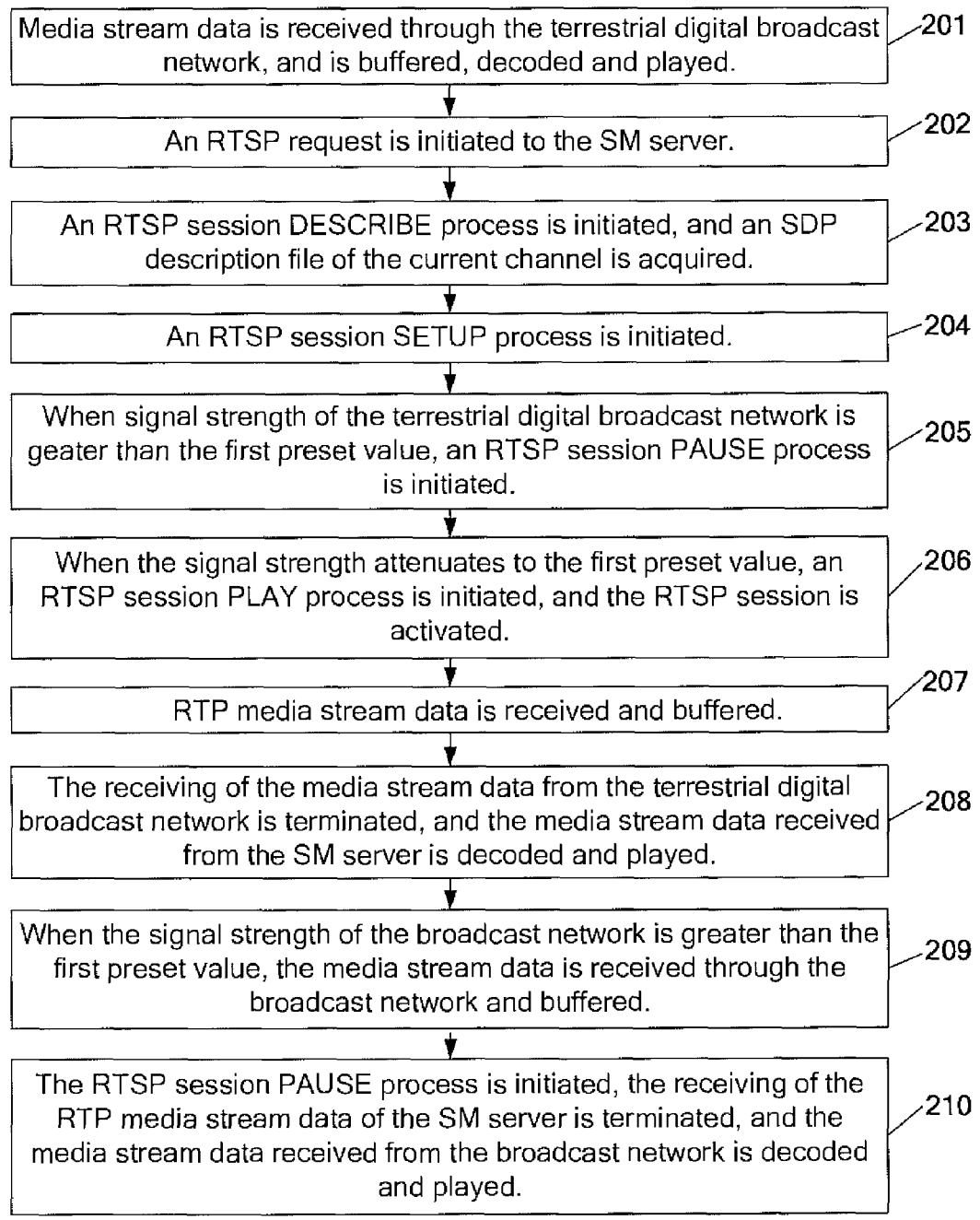
FIG. 2 is a schematic flow chart of a network switching method for mobile multimedia services according to another embodiment of the present invention.

FIG. 2 is a schematic flow chart of a network switching method for mobile multimedia services according to another embodiment of the present invention. When the user of the mobile terminal uses mobile phone TV services in such moving environments as highway or train, and the network providing services is also a hybrid network according to the embodiment of the present invention, switching between the two networks may occur more frequently. This embodiment can further reduce the time required for establishing an interactive connection of an RTSP session by the mobile terminal with the SM server through the mobile communication network and required for establishing the RTSP session during each switching process, which specifically includes the following steps.

In step 201, according to TV channel frequency point information in the SG-Server, media stream data is received through the terrestrial digital broadcast network, and is buffered, decoded and played.

In step 202, according to an RTSP link of the current TV channel in the SG-Server, an RTSP request is initiated to the SM server through the mobile communication network.

In step 203, an RTSP session DESCRIBE process is initiated to the SM server, and a Session Description Protocol (SDP) description file of the current channel is acquired.

In step 204, an RTSP session SETUP process is initiated to the SM server.

In step 205, signal strength of the terrestrial digital broadcast network is detected, and when the signal strength is greater than the first preset value, an RTSP session PAUSE process is initiated to the SM server.

After receiving the RTSP session PAUSE process initiated by the mobile terminal, the SM server pauses sending RTP media data stream of the channel to the mobile terminal, but reserves the RTSP session.

The first preset value, that is, a signal strength value causing network switching may be preset in the mobile terminal or by the operator in the SG-Server, and needs to satisfy the following condition: time for which the signal strength of the terrestrial digital broadcast network attenuates from the value to such a value that the network is totally unavailable is equal to or slightly longer than time required for establishing a unicast connection between the mobile terminal and the SM server in the mobile communication network and buffering the media stream data until the media stream data is capable of being decoded and played. If the chosen strength value is improper, the terminal will receive excess media stream data of the mobile communication network in advance, or when the terrestrial digital broadcast network is unavailable, the mobile terminal is still buffering the media stream data of the mobile communication network, resulting in interruption of the ongoing multimedia services.

In step 206, when it is detected that the signal strength of the terrestrial digital broadcast network attenuates to the first preset value, an RTSP session PLAY process is initiated directly to the SM server, and the RTSP session is activated. After receiving the RTSP session PLAY process initiated by the terminal, the SM server sends RTP media stream data of the channel to the terminal.

This step does not need to start from the DESCRIBE of the RTSP, so that the time required from the step 202 of initiating the RTSP request to the step 204 is saved.

In step 207, the RTP media stream data of the SM server is received and buffered.

In step 208, a switching process is enabled, and when the RTP media stream data received by the mobile terminal is buffered to such an extent that the RTP media stream data is capable of being decoded, the receiving of the media stream data from the terrestrial digital broadcast network is terminated, and the RTP media stream data received from the SM server is decoded and played.

In step 209, when it is detected again that the signal strength of the terrestrial digital broadcast network is greater than the first preset value, the media stream data is received through the terrestrial digital broadcast network and buffered.

In step 210, when the media stream data received from the broadcast network is buffered to such an extent that the media stream data is capable of being decoded, the RTSP session PAUSE process is initiated to the SM server again, the receiving of the RTP media stream data of the SM server is stopped, and the media stream data received from the broadcast network is decoded and played.

After receiving the RTSP session PAUSE process initiated by the mobile terminal, the SM server stops sending the RTP media stream data of the channel to the terminal, but reserves the RTSP session. When the mobile terminal stops program playing, an RTSP session Teardown process is initiated, or after session reservation time expires, the RTSP session reserved at the SM server by the terminal is ended.

The session reservation time of the SM server may be set to a fixed value or a value indicating that the session is permanently reserved according to the actual operating condition. The session reservation time may also be determined according to the actual number of times of switching of the mobile terminal by using a certain strategy, for example, the operator provides a cardinal number for the number of times of switching in one hour in SG information, and each time the switching occurs, the session reservation time will be increased, while when no switching occurs within a period of time, the session reservation time will be reduced. The embodiments of the present invention are not limited to the strategy for determining the session reservation time. The mobile terminal may carry an adjusted session reservation time value in a request for next switching, and require the SM server to adjust the session reservation time, or the SM server determines the session reservation time according to the actual frequency of switching of the terminal.

In this embodiment, when using the terrestrial digital broadcast network to receive the mobile phone TV services instead of receiving the mobile phone TV services through the mobile communication network, the mobile terminal establishes an RTSP session with the SM server in the mobile communication network, but does not transport the media stream data. The mobile terminal causes the RTSP session established by the SM server to be in a state to be activated through the RTSP session PAUSE process, and the SM server reserves the RTSP session. After the mobile terminal detects that the signal strength of the broadcast network attenuates to a certain preset value, the RTSP session of the SM server of the mobile communication network is immediately activated through the RTSP session PLAY process, and the media stream data is received, buffered, decoded and played, thereby saving the interaction time from the initial request of the RTSP session to the establishment of the RTSP session. When the broadcast network becomes available again, the RTSP session of the SM server is deactivated and reserved again through the RTSP session PAUSE process.

Figure 3:
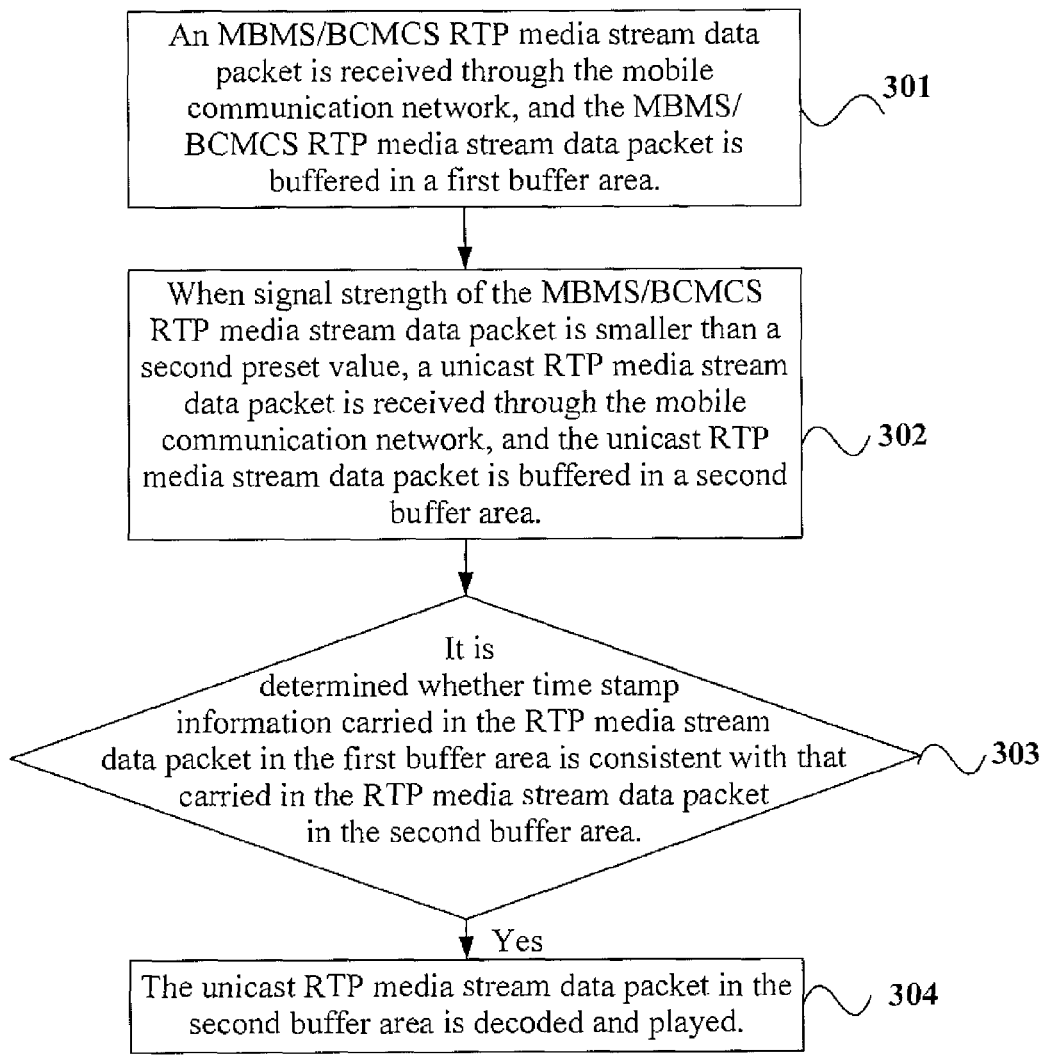
FIG. 3 is a schematic flow chart of another network switching method for mobile multimedia services according to an embodiment of the present invention.

Technologies based on 3G network include an MBMS technology and a BCMCS technology. Both the MBMS technology and the BCMCS technology provide the mobile phone TV services, that is, the media stream data to the terminal using broadcast technologies in the mobile communication network, and use dedicated broadcast channels which do not physically overlap with existing interactive communication channels, and the mobile terminal receives data of the channels separately. Both the MBMS and the BCMCS need to upgrade the existing communication network systems and deploy new network elements, while unicast SM does not need to do so. Therefore, in combination with consideration of cost or other factors, a mobile operator uses a certain channel to provide services in a hot spot area by using the MBMS and the BCMCS, and provide services in a non-hot spot area by using the unicast SM. In this way, when the mobile terminal moves, if it moves across a coverage area, the switching will occur. Through this embodiment, in the switching process from the broadcast mobile phone TV of the MBMS and the BCMCS of the mobile communication network to the unicast mobile phone TV of the mobile communication network, seamless switching of pictures can be achieved, thereby providing continuous pictures. In broadcast standards of the MBMS and the BCMCS as well as unicast of the mobile communication network, those received by the terminal are all Real-time Transport Protocol (RTP) media stream data packets over IP, which are actually RTP packets output by an encoder, and each RTP packet carries time stamp information. FIG. 3 is a schematic flow chart of another network switching method for mobile multimedia services according to an embodiment of the present invention. A TV channel can be provided to the mobile terminal through MBMS/BCMCS and unicast of the mobile communication network simultaneously. In this embodiment, media stream data firstly received through the mobile communication network is an MBMS RTP media stream data packet or a BCMCS RTP media stream data packet. After the broadcast mobile phone TV of the MBMS and the BCMCS is played, this embodiment may further include a switching process from the broadcast mobile phone TV of the MBMS or the BCMCS of the mobile communication network to the unicast mobile phone TV of the mobile communication network, which specifically includes the following steps.

In step 301, the MBMS/BCMCS RTP media stream data packet is received through the mobile communication network, and the MBMS/BCMCS RTP media stream data packet is buffered in a first buffer area.

In step 302, signal strength of the MBMS/BCMCS RTP media stream data packet is detected, and when the signal strength is smaller than a second preset value, a unicast RTP media stream data packet is received in parallel through the mobile communication network, and the unicast RTP media stream data packet is buffered in a second buffer area.

The second preset value, that is, a signal strength value causing switching of the form of the network service may be preset in the mobile terminal or by the operator in the SG-Server, and needs to satisfy the following condition: time for which the signal strength of the MBMS RTP media stream data packet attenuates from the value to such a value that the service of the mobile communication network is totally unavailable is equal to or slightly longer than a sum of time required for establishing a unicast connection between the mobile terminal and an SM server in the mobile communication network plus time required for buffering the media stream data until the media stream data is capable of being decoded and played. If the chosen strength value is improper, the terminal will receive excess unicast RTP media stream data of the mobile communication network in advance, or when the MBMS service of the mobile communication network is unavailable, the mobile terminal is still buffering the unicast RTP media stream data of the mobile communication network, resulting in interruption of the ongoing multimedia services.

In step 303, it is determined whether time stamp information carried in the MBMS/BCMCS RTP media stream data packet in the first buffer area is consistent with that carried in the unicast RTP media stream data packet in the second buffer area, and if yes, step 304 is executed.

In step 304, switching is performed from the first buffer area to the second buffer area, and the unicast RTP media stream data packet in the second buffer area is decoded and played.

In this embodiment, in a network in which the mobile communication network provides the mobile phone TV services, the mobile terminal is switched in a service that provides the mobile phone TV services by using the MBMS or BCMCS of the mobile communication network and the unicast of the mobile communication network. After the mobile terminal receives the MBMS or BCMCS of the mobile communication network, seamless switching of pictures from the broadcast mobile phone TV of the MBMS and the BCMCS of the mobile communication network to the unicast mobile phone TV of the mobile communication network can be achieved, so that the time delay in the switching process is prevented, and the service interruption caused by the switching of the service providing mode of the mobile communication network when the mobile terminal performs multimedia services is prevented, thereby providing continuous pictures.

Further, in the above two embodiments of the network switching method for mobile multimedia services of the present invention, after being switched in the network providing the mobile phone TV services that is formed by hybrid networking of the terrestrial digital broadcast network and the mobile communication network, the mobile terminal may also be further switched in the service that provides the mobile phone TV services by using the MBMS or BCMCS of the mobile communication network and the unicast of the mobile communication network, and the method is the same as that described in the embodiment of the other network switching method for mobile multimedia services of the present invention. After the mobile terminal is switched from the terrestrial digital broadcast network to the MBMS or BCMCS of the mobile communication network, seamless switching of pictures from the broadcast mobile phone TV of the MBMS and the BCMCS of the mobile communication network to the unicast mobile phone TV of the mobile communication network can be further achieved, so that the time delay in the switching process is prevented, and the service interruption caused by the switching of the service providing mode of the mobile communication network when the mobile terminal performs multimedia services is prevented, thereby providing continuous pictures.

Figure 4:
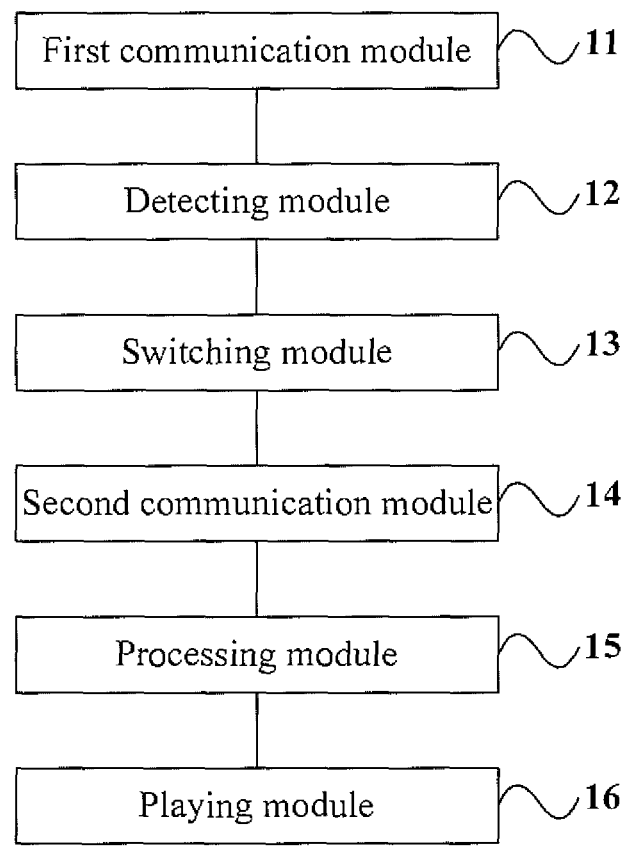
FIG. 4 is a schematic structural view of a network switching device for mobile multimedia services according to an embodiment of the present invention.

FIG. 4 is a schematic structural view of a network switching device for mobile multimedia services according to an embodiment of the present invention. This embodiment includes a first communication module 11, a detecting module 12, a switching module 13, a second communication module 14, a processing module 15 and a playing module 16. The first communication module 11 communicates with a first network, and is configured to receive media stream data of the first network. The detecting module 12 is connected to the first communication module 11, and is configured to detect signal strength of the media stream data of the first network. The switching module 13 is connected to the detecting module 12, and is configured to enable pre-switching when the detecting module 12 detects that the signal strength of the media stream data of the first network is smaller than a first preset value. The second communication module 14 communicates with a second network and is connected to the switching module 13, and is configured to receive media stream data of the second network in parallel when the switching module 13 enables the pre-switching. The processing module 15 is connected to the communication module 14, and is configured to buffer the media stream data of the second network. The playing module 16 is connected to the processing module 15, and is configured to decode the buffered media stream data of the second network, and play the decoded media stream data of the second network.

Further, this embodiment may further include a connecting module, which is configured to establish a Real Time Streaming Protocol (RTSP) session connection with an SM server of the second network and send an RTSP session PAUSE request before the detecting module detects the signal strength of the media stream data of the first network, and send an RTSP session PLAY request when the switching module enables the pre-switching. When the mobile terminal uses the terrestrial digital broadcast network to receive the mobile phone TV services instead of receiving the mobile phone TV services through the mobile communication network, the connecting module establishes an RTSP session with the SM server in the mobile communication network, but does not transport the media stream data. The connecting module causes the RTSP session established by the SM server to be in a state to be activated through an RTSP session PAUSE process, and the SM server reserves the RTSP session. After the detecting module detects that the signal strength of the broadcast network attenuates to a certain preset value, the connecting module immediately activates the RTSP session of the SM server of the mobile communication network through an RTSP session PLAY process, so that the second communication module receives the media stream data of the mobile communication network, and the processing module and the playing module buffer, decode and play the media stream data, thereby saving the interaction time from the initial request of the RTSP session to the establishment of the RTSP session. When the broadcast network becomes available again, the connecting module causes the RTSP sessions of the SM server to be deactivated and reserved again through the RTSP session PAUSE process.

In this embodiment, the processing module may include a third buffer unit and a terminating unit connected to each other. The third buffer unit is configured to buffer the media stream data of the second network. The terminating unit is configured to terminate the receiving of the media stream data of the first network by the first communication module.

In this embodiment, the network switching device for mobile multimedia services is the mobile terminal, the first network may be, but not limited to, the terrestrial digital broadcast network, and the second network may be, but not limited to, the mobile communication network. The first preset value, that is, a signal strength value causing network switching may be preset in the mobile terminal or by the operator in the SG-Server, and needs to satisfy the following condition: time for which the signal strength of the terrestrial digital broadcast network attenuates from the value to such a value that the network is totally unavailable is equal to or slightly longer than time required for establishing a unicast connection between the mobile terminal and the SM server in the mobile communication network and buffering the media stream data until the media stream data is capable of being decoded and played. If the chosen strength value is improper, the terminal will receive excess media stream data of the mobile communication network in advance, or when the terrestrial digital broadcast network is unavailable, the mobile terminal is still buffering the media stream data of the mobile communication network, resulting in interruption of the ongoing multimedia services.

In this embodiment, switching is performed in a network providing mobile phone TV services that is formed by the hybrid networking of the terrestrial digital broadcast network and the mobile communication network. When the first communication module receives the media stream data of the terrestrial digital broadcast network, the detecting module detects the frequency signal strength of the media stream of the broadcast network, and when the detecting module detects that the frequency signal strength of the broadcast network attenuates to a preset value, the switching module enables the pre-switching. At this time, the second communication module receives the mobile phone TV services, that is, the media stream data from the mobile communication network in parallel. When the received media stream data is buffered to such an extent that the media stream data is capable of being decoded and played, the processing module terminates the receiving of the media stream data from the broadcast network, and the playing module decodes and plays the media stream data received from the mobile communication network. Thus, the switching is completed. Through this embodiment, the time delay in the process of switching the serving network is reduced, and the service interruption caused by the network switching when the mobile terminal performs multimedia services is prevented.

Figure 5:
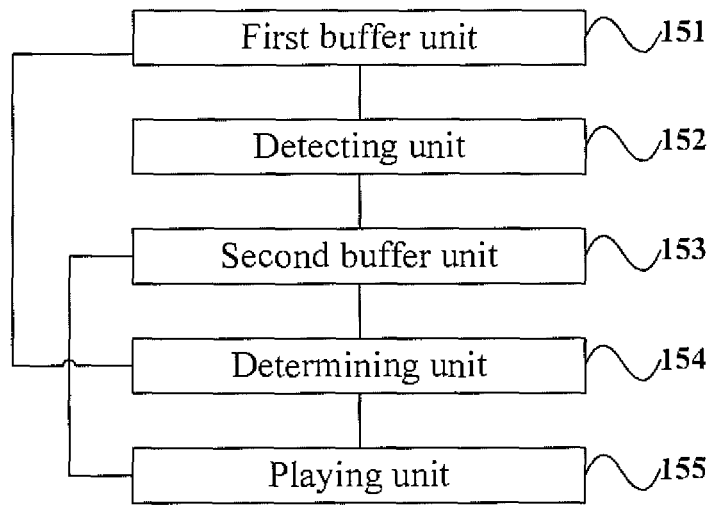
FIG. 5 is a schematic structural view of another network switching device for mobile multimedia services according to an embodiment of the present invention.

FIG. 5 is a schematic structural view of another network switching device for mobile multimedia services according to an embodiment of the present invention. A TV channel can be provided to the mobile terminal through MBMS/BCMCS and unicast of the mobile communication network simultaneously. In this embodiment, media stream data firstly received through the mobile communication network is an MBMS RTP media stream data packet or a BCMCS RTP media stream data packet, and a switching process from the broadcast mobile phone TV of the MBMS or the BCMCS of the mobile communication network to the unicast mobile phone TV of the mobile communication network may be further implemented. This embodiment includes a first buffer unit 151, a detecting unit 152, a second buffer unit 153, a determining unit 154 and a playing unit 155. The first buffer unit 151 is connected to the mobile communication network, and is configured to buffer an MBMS/BCMCS RTP media stream data packet of the mobile communication network in a first buffer area. The detecting unit 152 is connected to the first buffer unit 151, and is configured to detect signal strength of the MBMS/BCMCS RTP media stream data packet of the mobile communication network in the first buffer area. The second buffer unit 153 is connected to the mobile communication network and the detecting unit 152 each, and is configured to receive a unicast RTP media stream data packet of the mobile communication network in parallel, and buffer the unicast RTP media stream data packet of the mobile communication network in a second buffer area, when the detecting unit 152 detects that the signal strength is smaller than a second preset value. The determining unit 154 is connected to the first buffer unit 151 and the second buffer unit 153 each, and is configured to determine whether time stamp information carried in the RTP media stream data packet in the first buffer area is consistent with that carried in the RTP media stream data packet in the second buffer area. The playing unit 155 is connected to the determining unit 154 and the second buffer unit 153 each, and is configured to decode the RTP media stream data packet in the second buffer area and play the decoded RTP media stream data packet in the second buffer area, when the determining unit 154 determines that the time stamp information carried in the RTP media stream data packet in the first buffer area is consistent with that carried in the RTP media stream data packet in the second buffer area.

In this embodiment, in a network in which the mobile communication network provides the mobile phone TV services, the mobile terminal is switched in a service that provides the mobile phone TV services by using the MBMS or BCMCS of the mobile communication network and the unicast of the mobile communication network. After the mobile terminal receives the MBMS or BCMCS of the mobile communication network, seamless switching of pictures from the broadcast mobile phone TV of the MBMS and the BCMCS of the mobile communication network to the unicast mobile phone TV of the mobile communication network can be achieved, so that the time delay in the switching process is prevented, and the service interruption caused by the switching of the service providing mode of the mobile communication network when the mobile terminal performs multimedia services is prevented, thereby providing continuous pictures.

Figure 6:
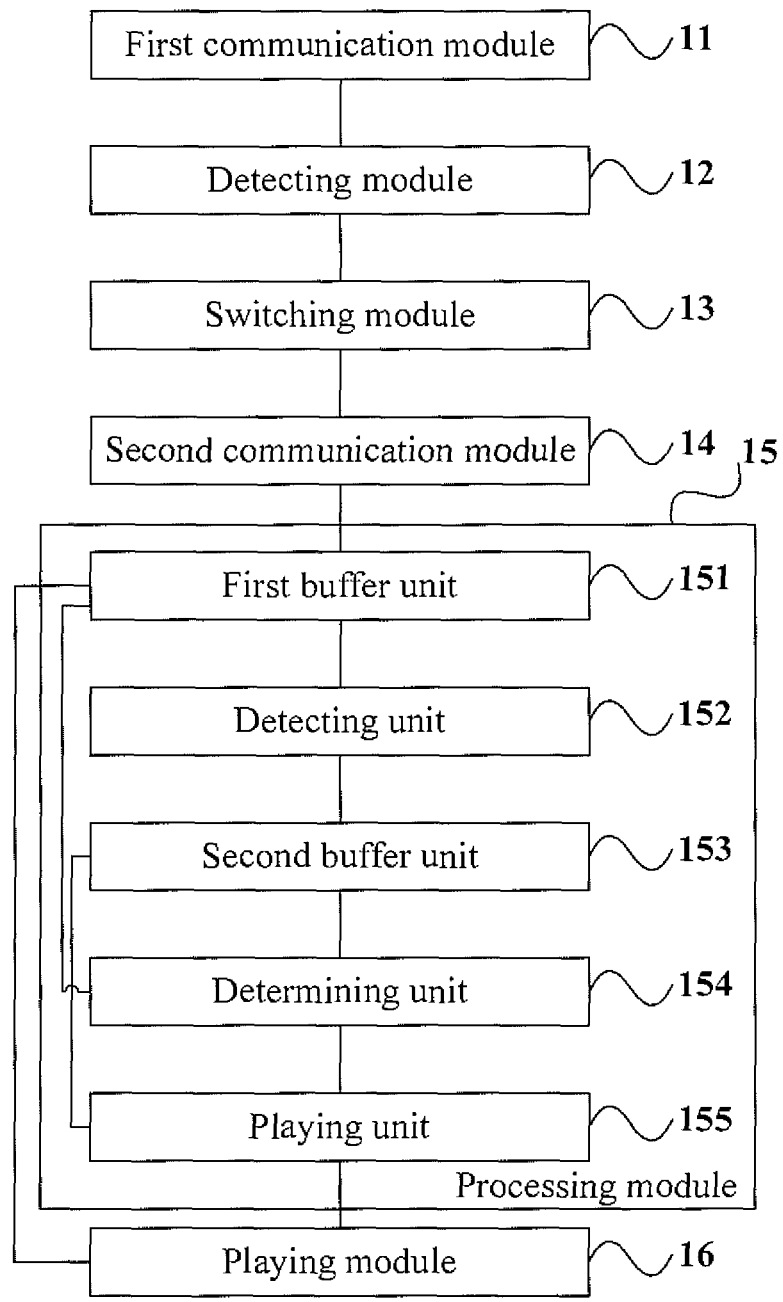
FIG. 6 is a schematic structural view of a network switching device for mobile multimedia services according to another embodiment of the present invention.

FIG. 6 is a schematic structural view of a network switching device for mobile multimedia services according to another embodiment of the present invention. In combination with the embodiment of the other network switching device for mobile multimedia services of the present invention, in this embodiment, media stream data firstly received through the mobile communication network by the second communication module may also be an MBMS RTP media stream data packet or a BCMCS RTP media stream data packet. Therefore, in this embodiment, after the playing module plays the broadcast mobile phone TV of the MBMS and the BCMCS, the processing module may further implement switching from the broadcast mobile phone TV of the MBMS or BCMCS to the unicast mobile phone TV of the mobile communication network. In this embodiment, the processing module 15 may include a first buffer unit 151, a detecting unit 152, a second buffer unit 153, a determining unit 154 and a playing unit 155. The first buffer unit 151 is connected to the second communication module 14 and the playing module 16 each, and is configured to buffer an MBMS/BCMCS RTP media stream data packet of the mobile communication network in a first buffer area. The playing module 16 decodes the MBMS/BCMCS RTP media stream data packet of the mobile communication network in the first buffer area, and plays the decoded MBMS/BCMCS RTP media stream data packet of the mobile communication network. The detecting unit 152 is connected to the first buffer unit 151, and is configured to detect signal strength of the MBMS/BCMCS RTP media stream data packet of the mobile communication network in the first buffer area. The second buffer unit 153 is connected to the mobile communication network and the detecting unit 152 each, and is configured to receive a unicast RTP media stream data packet of the mobile communication network in parallel, and buffer the unicast RTP media stream data packet of the mobile communication network in a second buffer area, when the detecting unit 152 detects that the signal strength is smaller than a second preset value. The determining unit 154 is connected to the first buffer unit 151 and the second buffer unit 153 each, and is configured to determine whether time stamp information carried in the RTP media stream data packet in the first buffer area is consistent with that carried in the RTP media stream data packet in the second buffer area.

The playing unit 155 is connected to the determining unit 154 and the second buffer unit 153 each, and is configured to decode the RTP media stream data packet in the second buffer area and play the decoded RTP media stream data packet in the second buffer area, when the determining unit 154 determines that the time stamp information carried in the RTP media stream data packet in the first buffer area is consistent with that carried in the RTP media stream data packet in the second buffer area.

In this embodiment, after the switching is performed in the network providing the mobile phone TV services that is formed by hybrid networking of the terrestrial digital broadcast network and the mobile communication network, the providing mode of the service that provides the mobile phone TV services by using the MBMS or BCMCS of the mobile communication network and the unicast of the mobile communication network is further switched. After the mobile terminal is switched from the terrestrial digital broadcast network to the MBMS or BCMCS of the mobile communication network according to the previous embodiment, seamless switching from the broadcast mobile phone TV of the MBMS or BCMCS to the unicast mobile phone TV of the mobile communication network can be further achieved through the processing module, so that the time delay in the switching process is prevented, and the service interruption caused by the switching of the service providing mode of the mobile communication network when the mobile terminal performs multimedia services is prevented, thereby providing continuous pictures.

On the basis of the above two embodiments of the network switching device for mobile multimedia services of the present invention, a first network and a second network are added to form an embodiment of a network switching system for mobile multimedia services of the present invention. The first network is configured to receive an encoded media signal, and provide media stream data of the first network to a mobile terminal. The second network is configured to receive the encoded media signal, and provide media stream data of the second network to the mobile terminal. The mobile terminal includes a first communication module, a detecting module, a switching module, a second communication module, a processing module and a playing module. The first communication module is configured to receive the media stream data of the first network. The detecting module is configured to detect signal strength of the media stream data of the first network. The switching module is configured to enable pre-switching when the detecting module detects that the signal strength of the media stream data of the first network is smaller than a first preset value. The second communication module is configured to receive the media stream data of the second network in parallel when the switching module enables the pre-switching. The processing module is configured to buffer the media stream data of the second network. The playing module is configured to decode the buffered media stream data of the second network, and play the decoded media stream data of the second network.

In this embodiment, the network switching device for mobile multimedia services is the mobile terminal, the first network may be, but not limited to, the terrestrial digital broadcast network, and the second network may be, but not limited to, the mobile communication network. The mobile terminal is switched in a network providing mobile phone TV services that is formed by hybrid networking of the terrestrial digital broadcast network and the mobile communication network. When the mobile terminal receives the media stream data of the terrestrial digital broadcast network, the frequency signal strength of the terrestrial digital broadcast network is detected, and when it is detected that the frequency signal strength of the broadcast network attenuates to a preset value, the pre-switching is enabled. At this time, the mobile terminal receives the mobile phone TV services, that is, the media stream data from the mobile communication network in parallel. When the received media stream data is buffered to such an extent that the media stream data is capable of being decoded and played, the receiving of the media stream data from the broadcast network is terminated, and the media stream data received from the mobile communication network is decoded and played. Thus, the switching is completed. Through this embodiment, the time delay in the process of switching the serving network is reduced, and the service interruption caused by the network switching when the mobile terminal performs multimedia services is prevented.

The second network includes an SM server, which is configured to store and control the media stream data. The SM server includes a session reserving unit, which is configured to reserve an RTSP session for a preset time length. After receiving the RTSP session PAUSE process initiated by the mobile terminal, the SM server stops sending the RTP media stream data of the channel to the terminal, but reserves the RTSP sessions. When the mobile terminal stops program playing, an RTSP session Teardown process is initiated, or after session reservation time expires, the RTSP session reserved at the SM server by the terminal is ended.

The session reservation time of the SM server may be set to a fixed value or a value indicating that the session is permanently reserved according to the actual operating condition. The session reservation time may also be determined according to the actual number of times of switching of the mobile terminal by using a certain strategy, for example, the operator provides a cardinal number for the number of times of switching in one hour in SG information, and each time the switching occurs, the session reservation time will be increased, while when no switching occurs within a period of time, the session reservation time will be reduced. The embodiments of the present invention are not limited to the strategy for determining the session reservation time. The mobile terminal may carry an adjusted session reservation time value in a request for next switching, and require the SM server to adjust the session reservation time, or the SM server determines the session reservation time according to the actual frequency of switching of the terminal.

Persons of ordinary skill in the art should understand that all or a part of the steps of the method according to the embodiments of the present invention may be implemented by a program instructing relevant hardware, and the program may be stored in a computer readable storage medium, such as a Read-Only Memory (ROM), a Random Access Memory (RAM), a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A network switching method for mobile multimedia services, the method comprising:

sending a Real Time Streaming Protocol (RTSP) DESCRIBE request to an acquiring point that provides media stream data in a second network, and acquiring a Session Description Protocol (SDP) description file;

sending an RTSP session SETUP request according to the description file to the acquiring point; and sending an RTSP session PAUSE request to the acquiring point after receiving an RTSP session SETUP response message;

setting a first preset value, wherein time for which the signal strength of media stream data of a first network attenuates from the first preset value to such a value that the first network is unavailable is equal to or longer than a sum of time required for establishing a unicast connection with a Streaming Media (SM) server plus time required for buffering the media stream data of the second network until the media stream data of the second network is capable of being decoded and played;

detecting signal strength of media stream data of the first network, and when the signal strength of the media stream data of the first network is smaller than the first preset value, sending an RTSP session PLAY request and receiving the media stream data of the second network in parallel with the media stream data of the first network, wherein the first network is a terrestrial digital broadcast network, and the second network is a mobile communication network; and buffering the media stream data of the second network, when the media stream data of the second network is buffered to such an extent that the media stream data of the second network is capable of being decoded, terminating receiving and playing of the media stream data of the first network, and decoding the buffered media stream data of the second network, and playing the decoded media stream data of the second network.

2. The network switching method for mobile multimedia services according to claim 1, wherein after the playing the decoded media stream data of the second network, the method further comprises:

detecting the signal strength of the media stream data of the first network, and when the signal strength of the media stream data of the first network is greater than the first preset value, sending the RTSP session PAUSE request carrying RTSP session reservation time.

3. The network switching method for mobile multimedia services according to claim 1, wherein the media stream data of the second network is a Multimedia Broadcast/Multicast Service (MBMS) Real-time Transport Protocol (RTP) media stream data packet or a Broadcast Multicast Service (BCMCS) RTP media stream data packet; wherein after the playing the decoded media stream data of the second network, the method further comprises:

buffering the MBMS RTP media stream data packet or the BCMCS RTP media stream data packet of the second network in a first buffer area;

when it is detected that signal strength of the MBMS RTP media stream data packet or the BCMCS RTP media stream data packet of the second network is smaller than a second preset value, receiving a unicast RTP media stream data packet of the second network in parallel with the MBMS RTP media stream data packet or the BCMCS RTP media stream data packet, and buffering the unicast RTP media stream data packet of the second network in a second buffer area; and when time stamp information carried in the RTP media stream data packet in the first buffer area is consistent with that carried in the RTP media stream data packet in the second buffer area, decoding the RTP media stream data packet in the second buffer area, and playing the decoded RTP media stream data packet in the second buffer area.

4. The network switching method for mobile multimedia services according to claim 3, further comprising: setting the second preset value, wherein time for which the signal strength of the MBMS RTP media stream data packet or the BCMCS RTP media stream data packet of the second network attenuates from the second preset value to such a value that the network is totally unavailable is equal to or longer than a sum of time required for establishing a unicast connection with the SM server plus time required for buffering the unicast RTP media stream data packet of the second network until the unicast RTP media stream data packet of the second network is capable of being decoded and played.

5. A network switching device for mobile multimedia services, the device comprising a processor and a non-transitory computer readable storage medium, wherein the non-transitory computer readable storage medium comprises computer program code which when executed by the processor causes the processor to:

receive media stream data of a first network;

detect signal strength of the media stream data of the first network;

enable pre-switching when detecting that the signal strength of the media stream data of the first network is smaller than a first preset value, wherein time for which the signal strength of the media stream data of the first network attenuates from the first preset value to such a value that the first network is unavailable is equal to or longer than a sum of time required for establishing a unicast connection with a Streaming Media (SM) server plus time required for buffering media stream data of a second network until the media stream data of the second network is capable of being decoded and played;

receive the media stream data of the second network in parallel with the media stream data of the first network when enabling the pre-switching, wherein the first network is a terrestrial digital broadcast network, and the second network is a mobile communication network;

buffer the media stream data of the second network; and terminate receiving and playing of the media stream data of the first network when the media stream data of second network is buffered to such an extent that the media stream data of the second network is capable of being decoded, and decoding the buffered media stream data of the second network, and playing the decoded media stream data of the second network;

establish a Real Time Streaming Protocol (RTSP) session connection with an acquiring point that providing the media stream data in the second network and send an RTSP session PAUSE request to the acquiring point before detecting the signal strength of the media stream data of the first network, and send an RTSP session PLAY request when enabling the pre-switching.

6. The network switching device for mobile multimedia services according to claim 5, wherein further comprising computer program code which when executed by the processor causes the processor to:

buffer a Multimedia Broadcast/Multicast Service (MBMS) Real-time Transport Protocol (RTP) media stream data packet or a Broadcast Multicast Service (BCMCS) RTP media stream data packet of the second network in a first buffer area;

detect signal strength of the MBMS RTP media stream data packet or the BCMCS RTP media stream data packet of the second network in the first buffer area;

receive a unicast RTP media stream data packet of the second network in parallel with the MBMS RTP media stream data packet or the BCMCS RTP media stream data packet and buffer the unicast RTP media stream data packet of the second network in a second buffer area when detecting that the signal strength is smaller than a second preset value;

determine whether time stamp information carried in the RTP media stream data packet in the first buffer area is consistent with that carried in the RTP media stream data packet in the second buffer area; and decode the RTP media stream data packet in the second buffer area and playing the decoded RTP media stream data packet in the second buffer area, when determining that the time stamp information carried in the RTP media stream data packet in the first buffer area is consistent with that carried in the RTP media stream data packet in the second buffer area.

* * * * *